United States Patent [19]

Thun

[11] Patent Number: 4,651,590
[45] Date of Patent: Mar. 24, 1987

[54] BICYCLE PEDAL BEARING ASSEMBLY

[76] Inventor: Alfred H. Thun, Neuenloher Weg 14, Ennepetal, Fed. Rep. of Germany

[21] Appl. No.: 717,509

[22] Filed: Mar. 29, 1985

[30] Foreign Application Priority Data

May 18, 1984 [DE] Fed. Rep. of Germany ....... 3418499
Nov. 14, 1984 [DE] Fed. Rep. of Germany ....... 3441540

[51] Int. Cl.$^4$ .............................................. G05G 1/08
[52] U.S. Cl. ................................ 74/594.1; 74/594.4; 384/458
[58] Field of Search ....................... 384/458, 540, 489; 74/594.4, 594.1

[56] References Cited

U.S. PATENT DOCUMENTS 627,946 6/1899 Wilcox ............................... 384/458
986,596 3/1911 Schenck .............................. 384/458

Primary Examiner—Larry I. Schwartz
Attorney, Agent, or Firm—Karl F. Ross; Herbert Dubno

[57] ABSTRACT

A bicycle-type pedal assembly has a frame sleeve extending along and centered on a sleeve axis and having a pair of axially opposite sleeve ends, and a pedal shaft extending coaxially through the sleeve, having an end carrying a radially projecting and unitarily formed pedal and a sprocket, and having a pair of radially outwardly directed races also directed axially outward away from each other. This shaft has a predetermined outer diameter at the races and is of smaller diameter therebetween. A bearing tube including an inner tube part has an external thread and an outer tube part having an internal thread. The parts are coaxial to the sleeve and shaft with the threads engaged and have an inner diameter greater than the other diameter of the shaft. Thus the shaft can be inserted axially through the tube parts, which have respective outer tube ends forming radially inwardly directed tube races directed axially inward toward each other and confronting the respective shaft races. Respective annular rows of roller elements are engaged between the tube races and the respective shaft races. Respective end caps snugly fit between the shaft, tube, and sleeve and generally axially close the tube and sleeve around the shaft.

20 Claims, 6 Drawing Figures

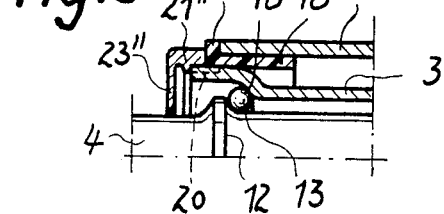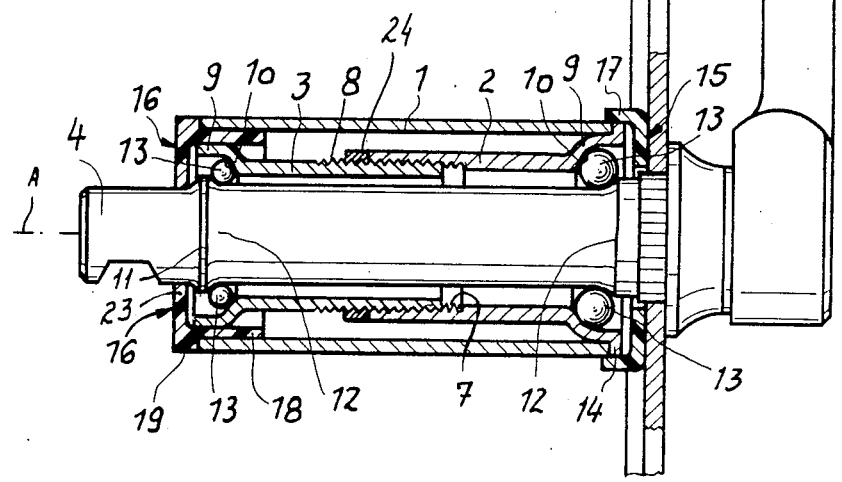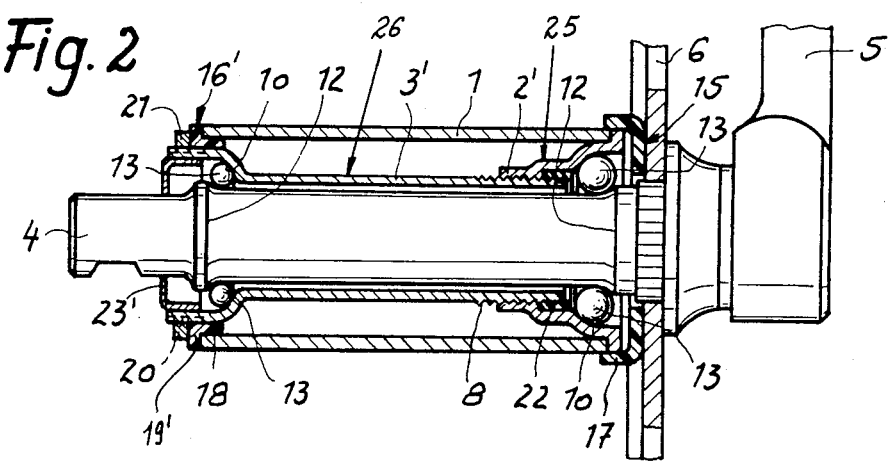

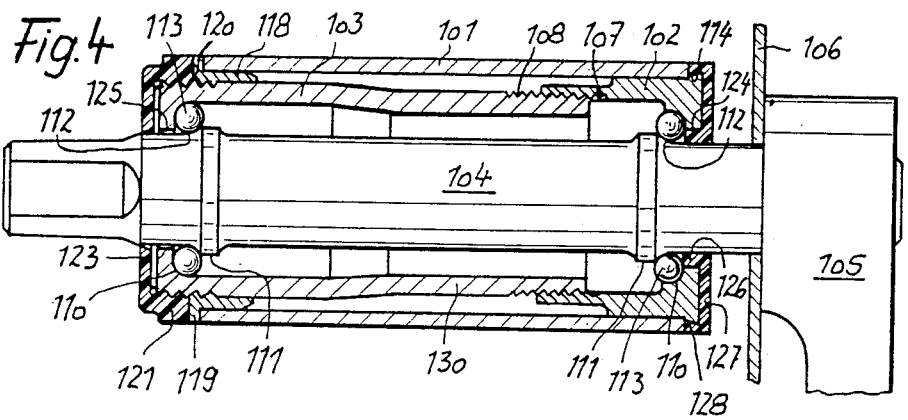
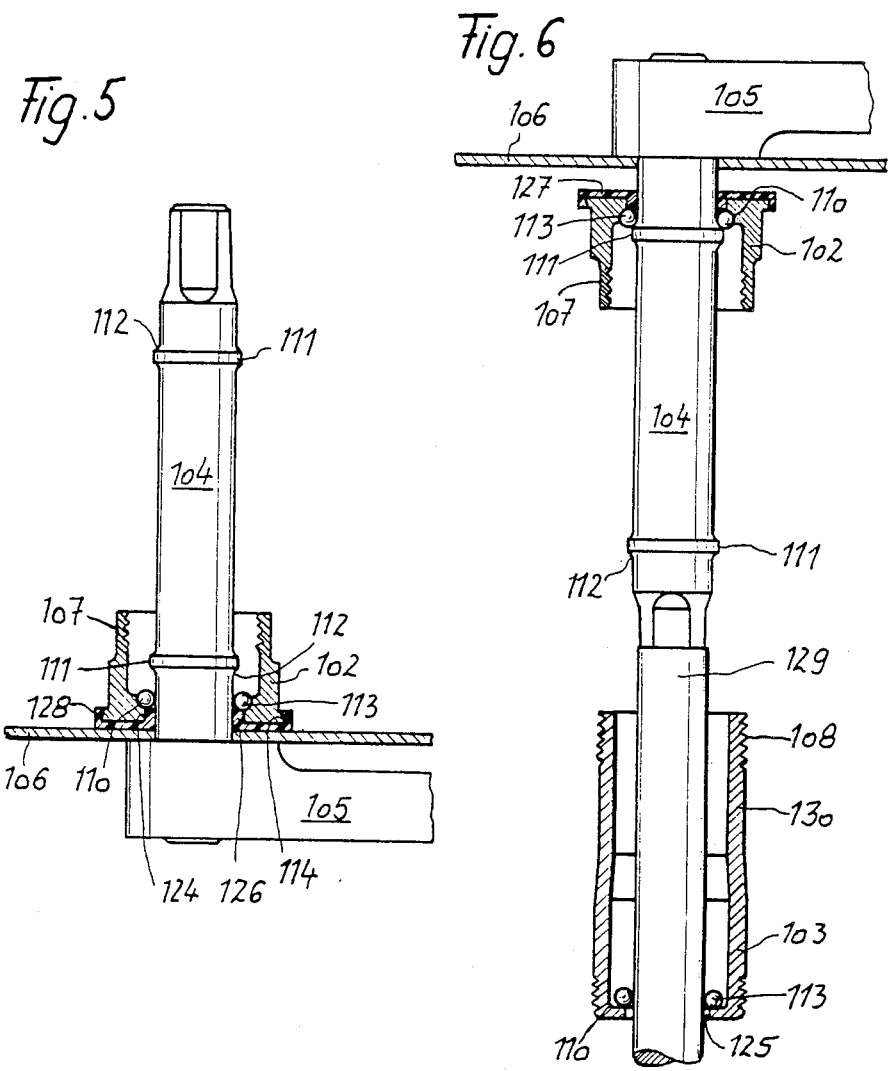

BICYCLE PEDAL BEARING ASSEMBLY

FIELD OF THE INVENTION

The present invention relates to a bicycle-type pedal bearing assembly. More particularly this invention concerns such a unit which is mounted as a complete assembly in a sleeve of a bicycle frame.

BACKGROUND OF THE INVENTION

A standard pedal bearing assembly is described in German utility model No. 8,305,001 which has a frame sleeve extending along and centered on a sleeve axis and having a pair of axially opposite sleeve ends. A pedal shaft extending coaxially through the sleeve has a pair of radially outwardly directed races also directed axially outward away from each other. The shaft has a predetermined outer diameter at the races. A bearing tube is formed of an inner tube part having an external thread and an outer tube part having an internal thread. The parts are coaxial to the sleeve and shaft with the threads engaged and have an inner diameter greater than the outer diameter of the shaft. In addition these parts have respective outer tube ends forming radially inwardly directed tube races directed axially inward toward each other and confronting the respective shaft races. Respective annular rows of roller elements are engaged between the tube races and the respective shaft races.

With such an arrangement it is necessary to make both pedals removable from the shaft, so that the bearing balls can be fitted into place. This adds some expense to the unit, which generally is so difficult to assemble and adjust that this can only be done in a shop. In addition this type of pedal assembly is particularly prone to wear, mainly because dirt can relatively easily enter either of its ends.

SUMMARY OF THE INVENTION

A bicycle-type pedal assembly according to the invention has a frame sleeve extending along and centered on a sleeve axis and having a pair of axially opposite sleeve ends, and a pedal shaft extending coaxially through the sleeve, having an end carrying a radially projecting and unitarily formed pedal and a sprocket, and having a pair of radially outwardly directed races also directed axially outward away from each other. This shaft has a predetermined outer diameter at the races and is of smaller diameter therebetween. A bearing tube including an inner tube part has an external thread and an outer tube part having an internal thread. The parts are coaxial to the sleeve and shaft with the threads engaged and have an inner diameter greater than the outer diameter of the shaft. Thus the shaft can be inserted axially through the tube parts, which have respective outer tube ends forming radially inwardly directed tube races directed axially inward toward each other and confronting the respective shaft races. Respective annular rows of roller elements are engaged between the tube races and the respective shaft races. Respective end caps snugly fit between the shaft, tube, and sleeve and generally axially close the tube and sleeve around the shaft.

It is therefore possible to make one of the pedals unitary with the shaft, and to fit the device together by dropping the screwed-together parts over the free end of the shaft. Once thus fit together the balls are dropped into place, and the two tube parts are screwed apart to set the desired bearing play.

According to this invention the outer ends are flared radially outwardly from the respective tube parts. This makes it possible to produce these tube parts cheaply from sheet-metal tubing. In addition the outer end closer to the sprocket and pedal is formed with a radially outwardly projecting rim bearing axially in one direction directly on the sleeve, and this one outer end is of an outside diameter equal to the inside diameter of the respective sleeve end, making this more heavily loaded end of the bearing assembly a good force-transmitting fit in the frame sleeve.

In accordance with further features of this invention both tube parts are formed substantially as principally cylindrical bodies of revolution. One of the caps has a radially projecting lip engaging axially over and radially around the respective sleeve end. In addition the one cap has a flange lying flatly against the sprocket and the other cap has an axially projecting and cylindrically annular rim engaged tightly radially between the other sleeve and and the respective tube end and a radially outwardly projecting rim engaging axially against the respective sleeve end. Once again this arrangement gives maximum strength at the sprocket end of the shaft.

The system of this invention has an outer tube part provided adjacent the internal screwthread with a thread-locking bushing of a material with a high coefficient of friction. The external screwthread bites into this bushing, preventing the tube parts from vibrating loose. In such an arrangement tools can be used when the outer tube part has a faceted region in which the bushing is mounted, and the inner part is formed with slots or facets so an appropriate wrench can hold it and enough torque can be brought to bear to screw the parts relative to each other.

In accordance with a further invention feature the outer tube part is substantially shorter than the inner tube part. In addition the one cap has a flange lying flatly against the sprocket and the other cap has a nut threaded to one of the tube ends and pressing the respective cap axially against the respective sleeve end. This nut can be provided with a radially inwardly projecting rim closely surrounding the shaft. In addition the other cap can include an L-shaped flexible element engaged between the respective tube end and the shaft.

According to another feature of this invention the tube diameter is greater than the shaft diameter by at least twice the ball diameter and this outer tube part is shiftable axially from a position pressing the respective balls against the respective shaft race to a position spaced at least the ball diameter toward the sprocket therefrom. In this arrangement, to leave some room for wiring to pass through the bicycle frame, the outer part has an axial length equal to about one-third the axial length of the tube and the inner part has an axial length equal to about two-thirds of this length and is of reduced diameter over approximately its inner axial half.

Both tube parts are formed of a synthetic resin, but can have metal liners at the respective races. In addition the end cap of the outer end is of C-section and engaged elastically thereover and the outer part fits tightly in the sprocket sleeve end and the inner part fits with play in the free sleeve end. The inner-end cap fits snugly radially between the outer end of the inner part and the free sleeve end.

Such an arrangement can most easily be assembled with the aid of a tool according to the invention which comprises an at least partially tubular rod in which the free end of the shaft is engageable and having a diameter smaller by at least twice the ball diameter than the inner tube diameter. Such a rod is fitted to the free end to allow the second set of balls to be emplaced.

DESCRIPTION OF THE DRAWING

The above and other features and advantages will become more readily apparent from the following, it being understood that any feature described with reference to one embodiment of the invention can be used where possible with any other embodiment. In the accompanying drawing:

FIG. 1 is an axial section through a pedal-shaft assembly according to the present invention;

FIG. 2 is a view like FIG. 1 showing another such pedal-shaft assembly in accordance with this invention;

FIG. 3 is a view of a detail of a variation of the FIG. 2 assembly;

FIG. 4 is an axial section through a further pedal-shaft assembly according to the invention;

FIG. 5 and 6 are views showing how the assembly of FIG. 4 is put together; and

FIG. 6 is a view similar to FIG. 5 showing the assembly in greater detail.

SPECIFIC DESCRIPTION

As seen in FIG. 1 a pedal assembly according to the invention is mounted in a sleeve 1 forming part of the bicycle frame and centered on a normally horizontal axis A. A pedal shaft 4 carried on the inner end of a pedal 5 passes along this axis A through a two-part bearing tube 2, 3 and carries a standard front chain sprocket 6 lying in a plane perpendicular to the axis A. The tube 2, 3 has a cylindrically tubular outer part 2 formed with an internal thread 7 and a cylindrically tubular inner part 3 formed with an external screwthread 8 engaged in the thread 7. A lock nut 24 prevents the two parts from rotating relative to each other once they are properly positioned.

The outer ends 9 of the tube parts 2 and 3 flare radially and axially outward and form radially inwardly and axially outwardly open races 10 of quarter-circular section centered on the axis A. The shaft 4 is formed generally complementarily integrally or by inserts with ridges 11 in turn forming axially inwardly and radially outwardly open races 12. Annular rows of balls 13 are received between each tube race 10 and the respective shaft race 12, providing solid resistance against relative axial or radial movement of the tube 2,3 and the shaft 4, as when fully assembled as illustrated in FIG. 1 the centers of curvatures of the races 10 and 12 are virtually at the same location, spaced only by the play set in the bearing assembly. In addition the end 9 of the outer tube part 2 is formed with a radially outwardly projecting flange or rim 14 having the same outside diameter as the cylindrical sleeve 1 and bearing axially against the respective end thereof.

The sprocket 6 carries an L-section seal ring 15 having an axially extending lip or rim 17 that engages axially around the rim 14 and the corresponding sleeve end, forming an interference fit that effectively prevents dirt from entering the bearing assembly. This ring 15 is normally made of a synthetic resin, a polyamide for example, so it is somewhat flexible.

The other end of the assembly is closed by another synthetic resin cap or ring 16 of T-section and having an axially extending annular rim 18 fitting snugly between the outside surface of the respective tube end 9 and the inside surface of the respective sleeve end, a radially outwardly projecting rim 19 bearing axially against the sleeve end, and a radially inwardly projecting lip or flange 23 lightly engaging the surface of the shaft 4. This cap 16 therefore effectively seals the opposite end of the bearing while snugly centering and securing the tube 2, 3 in the sleeve 1.

Such an arrangement is assembled together by first fitting the sprocket 6 and cap 15 to the shaft 4 adjacent the fixed pedal 5. The tube 2, 3 is screwed together so the axial spacing between its seats 10 is substantially less than will eventually be needed, and it is dropped over this shaft 4, with the axis A upright. The balls 13 are then fitted into the upwardly open seat 20 of the part 3 and the tube 2, 3 is then lifted to hold them in place. The system is inverted, the balls 13 are fitted into the opposite end, and the two parts 2' and 3' are screwed apart to take up the play and simultaneously capture the balls 13. The lock nut 24 is then screwed down and the thus assembled parts are poked through the sleeve 1. Then the cap 16 is tapped into place and the other not illustrated pedal is fitted to the opposite end of the shaft 4.

The arrangement of FIG. 2 is substantially identical to that of FIG. 1, with the same reference numerals being used for functionally identical structure. Here the part 3' is relatively long and formed basically of a sheet-metal tube and the part 2' is only about a quarter as long as the part 3' and is formed by stamping from a flat disk. In addition the part 2 is formed with an internally and externally faceted region 25 into which fits a synthetic-resin locking ring 22 into which the external thread 8 of the inner sleeve part 3 bites, to prevent the parts 2' and 340 from rotating relative to each other except when forcibly turned by tools. The part 3' has a faceted region 26 or may be formed with slots so it can be immobilized by a wrench as another wrench is fitted to the region 25 of the part 2' to fit the assembly together.

In addition in FIG. 2 the outer end of the assembly is sealed by an L-section cap 16' which, instead of an integral lip 23, has a separate L-section seal ring 23' with one leg extending axially and lying inside the outer tube end 9 and the other leg extending radially and lightly engaging the shaft 4. Furthermore, a nut 21 engaged in a thread 20 at the outer tube-part end presses the flange 19' of the cap 15' against the respective tube end.

FIG. 3 shows a variation on the system of FIG. 2, with a threaded nut 21'' formed integrally with the lip 23'' and bearing axially against the ring 16''. This arrangement, like that of FIG. 2, allows the bearing unit to be securely and easily mounted in the sleeve 1.

The arrangement of FIGS. 4 through 6 has sleeve 101 forming part of the bicycle frame and centered on a normally horizontal axis A. A pedal shaft 104 carried on the inner end of a pedal 105 passes along this axis A through a two-part bearing tube 102, 103 and carries a standard front chain sprocket 106 lying in a plane perpendicular to the axis A. The tube 102, 103 has a cylindrically tubular outer part 102 formed with an internal thread 107 and a cylindrically tubular inner part 103 formed with an external screwthread 108 engaged in the thread 107. The part 103 is about four times longer axially than the part 102.

The outer ends of the tube parts 102 and 103 flare radially and axially outward and form radially inwardly and axially outwardly open races 110 of quarter-circular section centered on the axis A. The shaft 104 is formed generally complementarily integrally or by inserts with ridges 111 in turn forming axially inwardly and radially outwardly open races 112. Annular rows of balls 113 are received between each tube race 110 and the respective shaft race 112, providing solid resistance against relative axial or radial movement of the tube 102, 103 and the shaft 104, as when fully assembled as illustrated in FIG. 4 the centers of curvatures of the races 110 and 112 are virtually at the same location, spaced only by the play set in the bearing assembly. In addition the end of the outer tube part 102 is formed with a radially outwardly projecting flange or rim 114 having the same outside diameter as the cylindrical sleeve 101 and bearing axially against the respective end thereof. The parts 102 and 103 have at their outer ends relatively small-diameter bores 124 and 125 delimiting the respective seats 110 and of a diameter only slightly greater than the outside diameter of the shaft 104 at the race-forming ridges 111, making it possible to fit the tubes 102 and 103 over the shaft 104.

The greatest diameter of the part 103 is about one to two times the wall thickness of the sleeve 101 smaller than the inner diameter of same, leaving all-around play between these two parts 101 and 103. This play is eliminated by an L-section ring 118, 119 having a radially outwardly projecting rim 119 bearing axially against the outer sleeve end and an annular cylindrical rim 118 engaged snugly between the part 103 and the inner surface of the outer end of the sleeve 101. A synthetic-resin cap 121 is screwed onto a thread 120 formed in the part 103 so that it can press the ring 118, 119 against the sleeve end, and has a radially inwardly projecting lip 123 which lightly engages the shaft 104 to prevent dirt from entering the bearing assembly from this end.

The other end of the assembly is closed by a ring cap 127 of an elastic synthetic resin which is of C-section and has an inner flange 126 engaged between the inner surface of the bore 124 and the outer surface of the shaft 104, and an outer flange 128 that fits over the undercut outer edge of the part 102. This cap 127 therefore effectively seals dirt out of this end of the bearing. It could also be made of two metal parts that are fitted together.

In order to have space, for instance, to run wiring for a taillight through the sleeve 101, the length of the part 102 is only about a third of the overall length of the assembly and the part 103 has an inner region 130 which is of reduced diameter and which has an overall length equal to about a half that of the assembly.

To put together this assembly the shaft 104 is first stood on the pedal end as illustrated in FIG. 5 and the sprocket 106, cap 127, and part 102 are fitted down over it. Then the balls 113 are dropped in, which is possible because the inside diameter of the part 102 is greater by twice the ball diameter than the outside shaft diameter at the shoulder 111, except at the race 110. and the part 102 is lifted to trap them between the seats 110 and 112. The device is then inverted and the free end of the shaft 104 is fitted into a guide sleeve 129 that is poked down through the upwardly open part 103. The remaining balls 113 are then dropped therein and the tube 103 is lifted and screwed onto the part 102, which once again is possible because the inside diameter of the part 103 is greater by twice the ball diameter than the outside diameter of the tool 129. This assembly can easily be taken apart by even a relatively unskilled mechanic for servicing or replacing any of its parts.

Once assembled, the entire unit is pushed through the sleeve 101, the seal cap 118, 119 is fitted in, and the cap 121 is screwed on to secure the entire unit in place. The tight fit between the outer part 102 and the sleeve 101 at the critical sprocket end of the shaft 104 ensures that the assembly will not wear at this region.

The arrangement according to this invention can be used with a pedal-operated coaster brake, or with a freerunning clutch. Known BSA pedal units can normally only be used with such a freerunning clutch whereas Thomsen-type arrangements are used with a coaster brake. Nonetheless the slim-profile system of this arrangement can be as small (35 mm to 40 mm) as the BSA type but as rugged as the larger Thomsen devices.

I claim:

1. A bicycle type pedal assembly comprising:
   a frame sleeve extending along and centered on a sleeve axis and having a pair of axially opposite sleeve ends;
   a pedal shaft extending coaxially through the sleeve, having an end carrying a sprocket, formed unitarily at the end with a radially projecting pedal, and formed unitarily axially offset from the end also with a pair of radially outwardly directed races directed axially outward away from each other and fixed relative to each other, the shaft having a predetermined outer diameter at the races and being of smaller diameter therebetween;
   a bearing tube including an inner tube part having an external thread and an outer tube having an internal thread, the parts being coaxial to the sleeve and shaft with the threads engaged and having an inner diameter greater than the outer diameter of the shaft, whereby the shaft can be inserted axially through the tube parts, the parts having respective outer tube ends forming radially inwardly directed tube races directed axially inward toward each other and confronting the respective shaft races;
   respective annular rows of roller elements engaged between the tube races and the respective shaft races; and
   respective end caps snugly fitting between the shaft, tube, and sleeve and generally axially closing the tube and sleeve around the shaft.

2. The pedal assembly defined in claim 1 wherein the outer ends are flared radially outwardly from the respective tube parts.

3. The pedal assembly defined in claim 2 wherein one of the outer ends is formed with a radially outwardly projecting rim bearing axially in one direction directly on the sleeve.

4. The pedal assembly defined in claim 2 wherein both tube parts are formed substantially as principally cylindrical bodies of revolution.

5. The pedal assembly defined in claim 1 wherein one of the caps has a radially projecting lip engaging axially over and radially around the respective sleeve end.

6. The pedal assembly defined in claim 5 wherein the one cap has a flange lying flatly against the sprocket.

7. The pedal assembly defined in claim 6 wherein the other cap has an axially projecting and cylindrically annular rim engaged tightly radially between the other sleeve and the respective tube end and a radially outwardly projecting rim engaging axially against the respective sleeve end.

8. The pedal assembly defined in claim 1 wherein the outer tube part is provided adjacent the internal screwthread with a thread-locking bushing of a material with a high coefficient of friction, the external screwthread being engaged in the bushing.

9. The pedal assembly defined in claim 8 wherein the outer tube part has a faceted region in which the bushing is mounted.

10. The pedal assembly defined in claim 1 wherein the outer tube part is substantially shorter than the inner tube part.

11. The pedal assembly defined in claim 1 wherein the one cap has a flange lying flatly against the sprocket and the other cap has a nut threaded to one of the tube ends and pressing the respective cap axially against the respective sleeve end.

12. The pedal assembly defined in claim 11 wherein the nut is provided with a radially inwardly projecting rim closely surrounding the shaft.

13. The pedal assembly defined in claim 11 wherein the other cap includes an L-shaped flexible element engaged between the respective tube end and the shaft.

14. A bicycle-type pedal assembly comprising:
 a frame sleeve extending along and centered on a sleeve axis and having a pair of axially opposite sleeve ends;
 a pedal shaft extending coaxially through the sleeve, having a sprocket and formed unitarily with a radially projecting pedal and carrying a sprocket and an opposite free end, the shaft being unitarily also formed with a pair of radially outwardly projecting ridges forming respective radially outwardly directed races also directed axially outward away from each other and fixed relative to each other, the shaft having a predetermined outer diameter at the races and being of a predetermined smaller shaft diameter therebetween;
 a bearing tube including an inner tube part adjacent the pedal and an outer tube part at the free shaft end and threaded to the inner part, the parts being coaxial to the sleeve and shaft and having an inner tube diameter greater than the outer diameter of the shaft, whereby the shaft can be inserted axially through the tube parts, the parts having respective outer tube ends forming radially inwardly directed tube races directed axially inward toward each other and confronting the respective shaft races, the tube having at its outer ends inner end diameters smaller than the tube diameter;
 respective annular rows of roller balls engaged between the tube races and the respective shaft races, the balls having a predetermined ball diameter, the tube diameter being greater than the shaft diameter by at least twice the ball diameter, the outer tube part being shiftable axially from a position pressing the respective balls against the respective shaft race to a position spaced at least the ball diameter toward the sprocket therefrom; and
 respective end caps snugly fitting between the shaft, tube, and sleeve and generally axially closing the tube and sleeve around the shaft.

15. The pedal assembly defined in claim 14 wherein the outer part has an axial length equal to about one-third the axial length of the tube, the inner part having an axial length equal to about two-thirds of this length and being of reduced diameter over approximately its inner axial half.

16. The pedal assembly defined in claim 14 wherein both tube parts are formed of a synthetic resin.

17. The pedal assembly defined in claim 14 wherein the end cap of the outer end is of C-section and engaged elastically thereover.

18. The pedal assembly defined in claim 14 wherein the outer part fits tightly in the sprocket sleeve end.

19. The pedal assembly defined in claim 18 wherein the inner part fits with play in the free sleeve end and the respective cap fits snugly radially between the outer end of the inner part and the free sleeve end.

20. In combination:
 a frame sleeve extending along and centered on a sleeve axis and having a pair of axially opposite sleeve ends;
 a pedal shaft extending coaxially through the sleeve, having a sprocket end carrying a radially projecting pedal and a sprocket and an opposite free end, and formed with a pair of radially outwardly projecting ridges forming respective radially outwardly directed races also directed axially outward away from each other, the shaft having a predetermined outer diameter at the races and being of a predetermined smaller shaft diameter therebetween;
 a bearing tube including an inner tube part adjacent the pedal and outer tube part at the free shaft end and threaded to the inner part, the parts being coaxial to the sleeve and shaft and having an inner tube diameter greater than the outer diameter of the shaft, whereby the shaft can be inserted axially through the tube parts, the parts having respective outer tube ends forming radially inwardly directed tube races directed axially inward toward each other and confronting the respective shaft races, the tube having at its outer ends inner end diameters smaller than the tube diameter;
 respective annular rows of roller balls engaged between the tube races and the respective shaft races, the balls having a predetermined ball diameter, the tube diameter being greater than the shaft diameter by at least twice the ball diameter, the outer tube part being shiftable axially from a position pressing the respective balls against the respective shaft race to a position spaced at least the ball diameter toward the sprocket therefrom;
 respective end caps snugly fitting between the shaft, tube, and sleeve and generally axially closing the tube and sleeve around the shaft; and
 an at least partially tubular rod in which the free end of the shaft is engagable and having a diameter smaller by at least twice the ball diameter than the inner tube diameter.

* * * * *